US010873572B1

(12) United States Patent
Krishna

(10) Patent No.: US 10,873,572 B1
(45) Date of Patent: Dec. 22, 2020

(54) TRANSFERRING A SINGLE SIGN-ON SESSION BETWEEN A BROWSER AND A CLIENT APPLICATION

(71) Applicant: MICRO FOCUS LLC, Santa Clara, CA (US)

(72) Inventor: Vamsi Krishna, Bengaluru (IN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/931,916

(22) Filed: May 14, 2020

(51) Int. Cl.
 *H04L 29/06* (2006.01)
 *H04L 29/08* (2006.01)
 *H04L 9/32* (2006.01)

(52) U.S. Cl.
 CPC ........ *H04L 63/0815* (2013.01); *H04L 9/3228* (2013.01); *H04L 67/34* (2013.01); *H04L 67/42* (2013.01)

(58) Field of Classification Search
 CPC ... H04L 63/0815; H04L 9/3228; H04L 67/34; H04L 67/42
 See application file for complete search history.

(56) References Cited

U.S. PATENT DOCUMENTS

| | | | |
|---|---|---|---|
| 8,756,665 B2 | 6/2014 | Pieczul et al. | |
| 8,918,848 B2 | 12/2014 | Sharma et al. | |
| 8,955,080 B2* | 2/2015 | Brunswig | G06F 21/41 726/8 |
| 9,092,609 B2* | 7/2015 | Pieczul | G06F 21/41 |
| 9,225,711 B1* | 12/2015 | Sorensen | H04L 63/0815 |
| 9,560,036 B2 | 1/2017 | Hinton et al. | |
| 9,985,955 B2 | 5/2018 | Mishra et al. | |

(Continued)

FOREIGN PATENT DOCUMENTS

EP 3120591 B1 9/2019

OTHER PUBLICATIONS

Wang et al, "A Single Sign-On Scheme For Cross Domain Web Applications Using Identity-Based Cryptography", 2010, 2010 Second International Conference on Networks Security, Wireless Communications and Trusted Computing, IEEE, p. 483-485.*

(Continued)

*Primary Examiner* — Christopher A Revak

(57) ABSTRACT

This document describes techniques and apparatuses for securely transferring a single sign-on session between a browser session and a client application. Responsive to a launch request from the browser session, a server sends a launch command to launch the application on the client to transfer the single sign-on session from the browser session to the application. The launch command includes a first security credential and a second security credential. The application then initiates a registration process by sending to the server the first security credential and a client identification unique to the client. The server passes the client identification to the browser session which confirms to the server that the client identification matches the client identification unique to the client. The server then sends the application a third security credential, and the application returns the client identification and an encrypted version of the second security credential relative to the third security credential. Upon receipt and verification of these security credentials, the server establishes the single sign-on session with the application.

20 Claims, 4 Drawing Sheets

(56) References Cited

U.S. PATENT DOCUMENTS

| | | | |
|---|---|---|---|
| 10,574,644 B2 | 2/2020 | Ananthapur Bache et al. | |
| 2005/0228863 A1* | 10/2005 | Palmeri | H04L 67/28 709/205 |
| 2016/0366121 A1* | 12/2016 | Rykowski | H04L 63/0815 |
| 2017/0155652 A1* | 6/2017 | Most | H04L 63/08 |
| 2020/0287885 A1* | 9/2020 | Rodniansky | H04L 63/0869 |

OTHER PUBLICATIONS

Indu et al, "Encrypted token based authentication with adapted SAML technology for cloud web services", Oct. 5, 2017, Journal of Network and Computer Applications 99, p. 131-145.*

Zhao et al, "Toward a secure and usable cloud-based password manager for web browsers", 2014, Computers & Security, p. 32-47.*

Identity & Authorization Management (I.AM) SSO from Fat to thin client technical Specifications; eHealth Platform; 16 pages; Oct. 30, 2018.

* cited by examiner

TRANSFERRING A SINGLE SIGN-ON SESSION BETWEEN A BROWSER AND A CLIENT APPLICATION

BACKGROUND

Endpoint management is commonly known as the ability to centrally detect, provision, deploy, update, and troubleshoot endpoint devices of an organization. An endpoint device may be any computing device communicating with a network. Example endpoint devices include desktops, workstations, servers, laptops, smartphones, and tablets. One critical issue regarding endpoint devices is that they are vulnerable entry points for cyberattacks.

Endpoint management products, as well as other products such as video or web conferencing products, and communication and collaboration platform products, may deploy a browser-based console for a user to use the product. In the example of an endpoint management product, a browser-based console allows an administrator to manage their endpoint devices. For example, an administrator may login to a management server, using a browser-based console on a client device, and using their Lightweight Directory Access Protocol (LDAP) credentials will authenticate with the management server to manage respective endpoint devices within a defined management zone. Because an administrator generally has full access to endpoint devices they manage, it is considered a critical cyberattack surface that needs to be protected.

Using a browser-based console with any of these example products, and particularly for endpoint management, has certain limitations relative to potentially performing a complete functional experience. For example, if an administrator of an endpoint management product wants to remotely control a managed device (e.g., using Remote Desktop Protocol (RDP) or Virtual Network Computing (VNC)), the browser-based experience limits the administrator in doing operations like File Transfer Protocol (FTP) or clipboard access from the browser client. Similarly, an administrator may need to bulk upload files to the management server from the client hosting the browser session. However, browser capabilities to perform such functions are limited. To overcome these and other limitations, a browser-based console may launch an application on the client hosting the browser session to provide the augmented capabilities, provided the client is a thick client (e.g., rich client) enabled for performing such functionalities.

However, an administrator will typically expect the launched thick-client application to continue to interact with the browser's administrative session to provide the additional functionality in a single sign-on (SSO) fashion. This means the administrator would not be required to separately log in to the thick-client application after having already logged into the browser session and authenticated with the management server. Requiring the thick-client application to prompt and re-authenticate the administrator is inefficient, unproductive, and even annoying. Thus, a technique known as registering protocol handlers, or sometimes referred to as registering native handlers, supported in most operating systems, provides one solution to enable single sign-on. This technique includes having a handler (e.g., application) registered on the thick client to handle a protocol scheme, such as a uniform resource locator (URL), to let the operating system launch the handler whenever a respective URL needs to be processed. In this context, a specific protocol scheme is registered, for example "zzz", and when the browser tries to render a URL such as "zzz://server/launch?token=blah", it simply launches the thick-client application that is already registered in the operating system.

In this context, the browser's administrative session may use the URL itself to pass a one-time access token to the registered native handler (e.g., thick-client application), which may be used by the native handler to achieve single sign-on to the management server. For example, the URL may be something like: "zzz://server/launch?operation=remotecontrol&otp=7CIMFZkeoy OFhTt7qjhn". The native handler will pass the one-time access token, or sometimes referred to as a one-time password (otp), to the management server, and once validated by the server, the server will create an authorized session with the thick-client application to allow the administrator to continue performing functions that were not allowed in the browser session.

However, this method of achieving single sign-on may be vulnerable to session hijacking. For example, the registration of native handlers is plural in some operating systems, meaning multiple handlers can be registered, thus allowing an attacker to register a malicious application to handle a previously defined protocol. As such, the operating system may invoke the malicious application with the "otp" and the administrative session can be hijacked. Additionally, the command line parameters of a launched application are readable in some operating systems. This also exposes the "otp" to malicious code which can potentially hijack the session.

DETAILED DESCRIPTION

Figure 1:
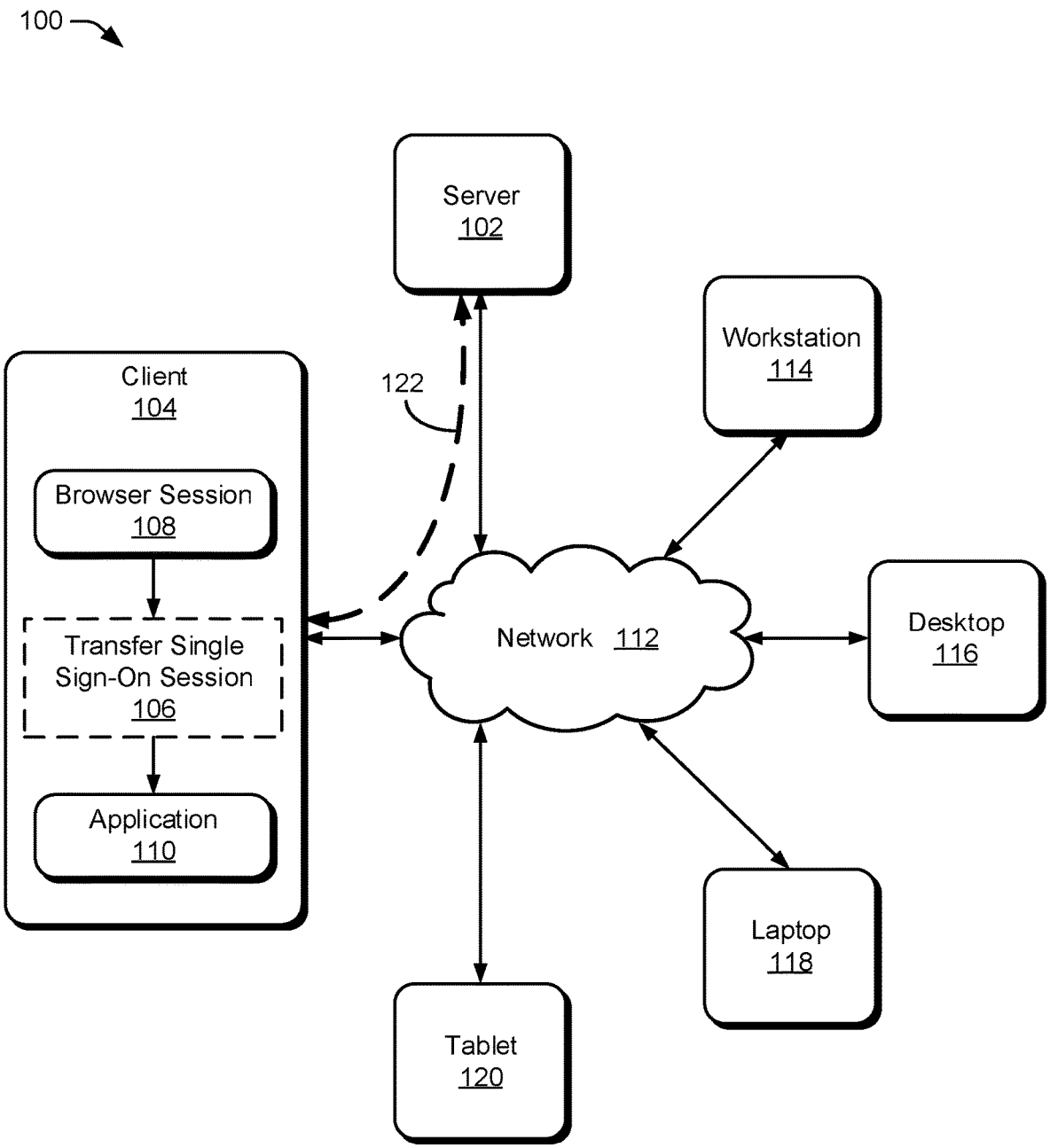
FIG. 1 is a block diagram illustrating a network of computing devices, including an example server and client coordinating to transfer a single sign-on session between a browser and an application on the client.

This document describes example methods, devices, and apparatuses for securely transferring a single sign-on (SSO) session between a browser and a client application, in coordination with a server managing the browser session. This transferring of a single sign-on session is performed with reduced session hijacking vulnerabilities by increasing security measures. In one aspect, this disclosure increases security measures when transferring a single sign-on session by introducing an additional registration step of the client application in combination with using additional security credentials. Securely transferring a single sign-on session between a browser and client application is beneficial, for example, where the client application may provide additional functionality over the browser session.

In one example, a method of transferring a single sign-on session between a browser session and an application includes a server receiving a launch request from an authenticated browser session to launch an application on a client. The server then sends a launch command to launch the application on the client, with the launch command including a first security credential and a second security credential. A registration process for the application begins upon the server receiving from the application a unique client identification of the client along with the first security credential. The server passes the unique client identification to the browser session for display by the browser session to a user. The application also displays the unique client identification so that a user of the browser session may compare the client identification displayed by the browser session with the client identification displayed by the application. Once the server receives from the user and browser session a confirmation indicating that the unique client identification is a match, as displayed by the browser session and the application, the server then sends the application a third security credential. When the server receives back from the application the unique client identification, along with an encrypted version of the second security credential, based on the third security credential acting as the encryption key, then the server establishes the single sign-on session with the application.

The system and/or operations of methods described in this disclosure may be embodied in whole or in part as programming instructions, such as firmware or software. The instructions may be stored on a non-transitory, machine-readable (e.g., computer/processor-readable) medium, such as a random-access memory (RAM), read-only memory (ROM), flash memory, cache memory, solid-state drive (SSD), hard disk drive (HDD), or combinations thereof, for execution on one or more processors in one or more computing systems. In some examples, implementing the operations of these methods may be achieved by one or more processors, or processor cores, reading and executing the programming instructions stored in the memory. In other examples, implementing the operations of the methods may be achieved using an application-specific integrated circuit (ASIC), such as a system-on-chip (SOC), and/or other hardware components either alone or in combination with programming instructions executable by one or more processors in one or more computing systems.

The example methods described in this disclosure may include more than one implementation, and different implementations may not employ every operation presented in a respective flow diagram, or may employ additional steps not shown in the respective diagram. Therefore, while the operations of methods are presented in a particular order within the flow diagrams, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

FIG. 1 is a block diagram 100 illustrating a network of computing devices, including an example server 102 and client 104 coordinating 122 to transfer a single sign-on session 106 between a browser session 108 and an application 110 on the client. The server 102 and client 104 communicate through a network 112, which may be, for example, any local area network (LAN), wide area network (WAN), cloud, multi-cloud, hybrid cloud, or private on-premise cloud computing environment. In this disclosure, as the server and client communicate, the terms "pass" and "send," or variations of these terms, may be used interchangeably to represent the exchange of communications between the server and client.

The server 102 may be a management server providing functionality for the browser session 108 and may include, for example, a Lightweight Directory Access Protocol (LDAP) database, for authorizing a single sign-on session with the browser session 108 with respect to a user of the browser session on the client 104. The client 104 may be any thick client (e.g., rich client) computing device such as a desktop, workstation, or laptop, with functional capabilities to enable the browser session 108 and execute the application 110.

In this example, the browser session 108, in coordination with the server 102, includes programming instructions that enable functionality for endpoint management of the computing devices on the network 112. However, the browser session may similarly provide other functionality, such as video or web conferencing, or other communication and collaboration operations. The application 110 includes programming instructions that enable functionality, in this example, that coordinate with or augment the endpoint management functionality of the browser session 108. However, the application 110 may similarly provide other functionality, such as video or web conferencing, or other communication and collaboration operations as may be dictated by, coordinated with, or related to the browser session.

The workstation 114, desktop 116, laptop 118, and tablet 120, are non-limiting examples of other computing devices or systems that may communicate on the network 112. In this example, when the browser session 108 is acting as an endpoint management console for the network 112 in coordination with the server 102, an user of the browser session may manage those computing devices on the network that are authorized under the endpoint management console browser session 108 to be managed.

In one aspect, a user of the browser session 108 may establish an authorized session with the server 102 for accomplishing browser-based endpoint management of devices on the network 112. If the user desires to perform certain functionality in that capacity that is not enabled through the browser session 108, then the user may initiate a secure transfer of the single sign-on session 106 from the browser session 108 to the application 110 according to principles of this disclosure. This transfer of the single sign-on session allows the application 110 to securely launch and provide augmented functionality beyond the browser session 108, without the user having to log in again or otherwise enter authorization credentials again.

Figure 2:
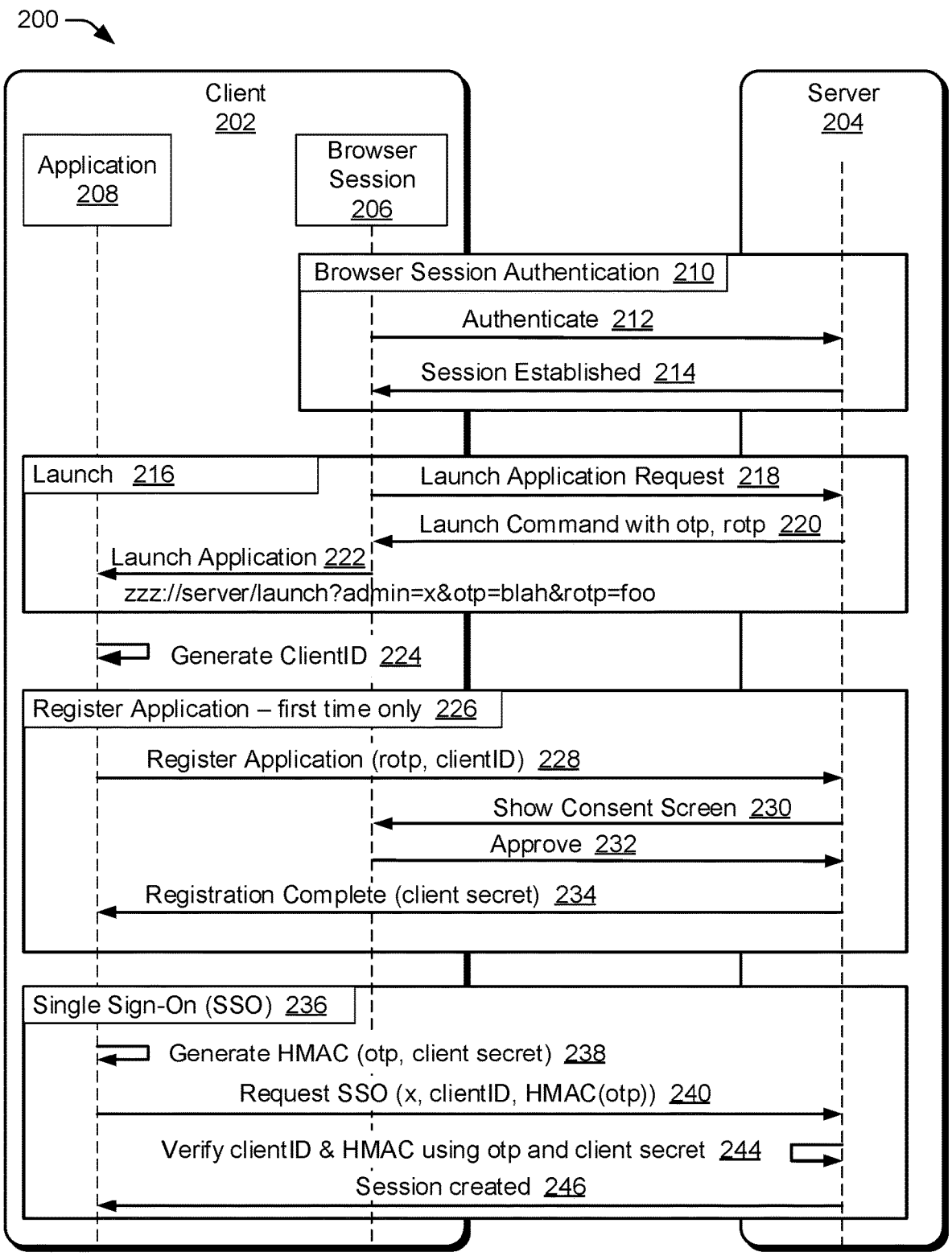
FIG. 2 is a block diagram illustrating example communications between a server and a client for transferring a single sign-on session between a browser and an application on the client.

FIG. 2 is a block diagram 200 illustrating example communications between a client 202 and a server 204 for securely transferring a single sign-on session between a browser session 206 and an application 208 on the client. The client 202 and the server 204 may be computing systems similar to those described in reference to FIG. 1. Initially, the browser session authentication 210 occurs by the browser session sending an authentication request 212 to the server 204. Once the server receives the request, and confirms that a user's credentials associated with the request are authentic, for example, by checking its LDAP database, then the server establishes the session 214 with the browser session 206 and the appropriate privileges. This enables the browser session 206 to perform the operations intended in association with a respective functionality provided by the server. For example, the browser session may be established to provide endpoint management services in cooperation with the server, video or web conferencing services, or other communication and collaboration functionality in cooperation with the server.

When the user of the browser session 206 needs augmented functionality beyond what the browser session provides, or for any other reason desires to launch an application 208 separate from the browser session, the user may take appropriate steps to launch 216 the application. This is accomplished by the user sending a launch application request 218 from the authenticated browser session 206, to the server 204, to launch the application 208 on the client 202. In this example illustrated, the client 202 is a thick client and executes both the browser session 206 and the application 208. However, in other aspects, the browser session 206 and the application 208 may be executed on separate computing devices.

After the server 204 receives the launch application request 218, it then sends a launch command 220 to the browser session 206 to launch the application 208 on the client 202. In one example, the launch command may be a URL configured to launch the application 222 in the context where a native handler has been registered on the client 202. In this scenario, the URL includes a first security credential and a second security credential as preliminary credentials for securely transferring the single sign-on session from the browser session to the application. The browser session may use the URL to pass the first and second security credentials to the registered native handler, which will be used by the native handler to launch the application and achieve single sign-on to the server 204. For example, the URL may be something like:

"zzz://server/launch?admin=x&otp=blah&rotp=foo"

In this example, the term "x" represents the user's identifier (e.g., identifying information), and the terms "otp" and "rotp" identify the first and second security credentials "foo" and "blah" (both arbitrary terms in this example). As used in this disclosure, security credentials may be any security element, code, credential, authentication credential, token, access token, one-time access token, password, one-time password, pass code, pass phrase, client secret, or other security aspect or evidence of authority, status, rights, entitlement to privileges, or the like. For example, "otp" may be considered a one-time password, and "rotp" may be considered an additional registration-related one-time password that provides additional security measures for transferring the single sign-on session under this disclosure. For this discussion, "rotp" will be arbitrarily considered the first security credential, and "otp" will be considered the second security credential, although they may be designated otherwise, and may be referenced with or with quotes for discussion purposes.

After the application launches 222, it generates a client identification 224 (e.g., clientID) representative of a unique identifier of the client 202. The clientID may be any random string, numerical value, or other identifier that uniquely identifies the client 202. The application 208 then requests to register itself 226 with the server 204. This is a one-time registration step for the application with respect to the client according to principles of this disclosure. To accomplish this, the application sends a register application request 228 to the server 204, including the first security credential (e.g., rotp) previously received from the server, along with the clientID recently generated. Upon receiving the clientID and the first security credential, the server then takes its initial steps to register the application by passing the clientID to the browser session 206. This may be done, for example, in the context of showing a consent screen 230 with the browser session to display the clientID to the user of the browser session. Simultaneously, the application 208 also displays the clientID on a user interface of the client 202 in a manner visible to the user.

In one aspect, the showing of the consent screen 230, and the displaying of the clientID by the application, may occur on a same screen of the client where the application and browser session are executing on the same client. In another example, if the application is launched on a device separate from the client of the browser session, then the user may refer to the clientID displayed by the application on the separate device. In either case, the clientID is displayed such that the user of the browser session may compare the clientID displayed by the browser session with the clientID displayed by the application. If the clientID displayed by the browser session matches that displayed by the application, then the user approves (e.g., confirms) 232 the clientID by way of the shown consent screen, and that confirmation is sent by the browser session to the server 204. Note, here, that if a malicious application executing on the client tries to use "rotp" and register itself, the server shows the consent screen on the browser session and the user will reject the approval because the clientID cannot be verified. This is because the malicious application does not have the clientID, and therefore the clientID is not presented on the consent screen. Thus, the user does not trust the malicious application as it was not the intended application to be launched.

Once the server receives approval confirmation 232 indicating that the client identification is a match, the server then sends the application 208 a third security credential indicating that registration is complete 234. In one example, this third security credential may be a unique token or client secret (e.g., a cryptographically secured pseudorandom number), but may be any other security credential as previously described. This sending of the third security credential indicates that registration of the application is complete with the server 204, and the server will now wait for an authorized single sign-on request from the application, including referencing the unique client secret.

Now, to initiate the single sign-on session 236, in one example the application encrypts the second security credential using the third security credential as the secret key 238. This encryption may be a cryptographic message authentication technique, such as a keyed-hash message authentication code (HMAC), using the second security credential (e.g., otp), and using the third security credential (e.g., client secret) as the secret key. For example: HMAC (otp, client secret).

The application then passes a request for a single sign-on session 240 to the server 204 with the appropriate authorization and security credentials information. This request may include the user's identifier (e.g., "x"), the clientID, and the encrypted second security credential (e.g., otp). As mentioned, in one example the second security credential is encrypted using the HMAC, and the third security credential (e.g., client secret) is used as the secret key for the HMAC. Thus, an example request by the application for a single sign-on session with the server may be: Request SSO (x, clientID, HMAC(otp)).

When the server receives the request for a single sign-on session, the server verifies 244 the user's identifier, clientID, and HMAC, by decrypting the HMAC with the second security credential (e.g., otp) by using the third security credential (e.g., client secret) as the secret key. The server can validate the HMAC as it is already aware of the client secret and the "otp." If all the credentials match the server information, and particularly if the HMAC(otp) matches the "otp" already maintained by the server, by referencing the client secret, then the server establishes (e.g., creates) the single sign-on session 246 with the application.

Note that, at any time, a user of the browser session 206 may revoke the single sign-on session transfer authorization for the application 208 or for a given client 202. The user can see, through the browser session, a list of approved applications and clients by way of, for example, listing approved clientIDs. Thus, the user can revoke any given single sign-on session authorization so that the server 204 will only approve single sign-on sessions for unrevoked clientIDs. In this context, the transferring or establishing of a single sign-on session between the browser and the application is contingent on the browser session not previously revoking the single sign-on session with the application, and the browser session not indicating to disallow establishing the single sign-on session.

Also note that even if a malicious application executing on the client 202 captures "otp" and "rotp" passed during the launch application event 222, the "otp" cannot be used for single sign-on by itself because the method described in this disclosure provides HMAC(otp). The malicious application will not be able to identify the clientID or client secret because they are shared between the client device and server over a secure channel. Thus, the technique and apparatuses of this disclosure reduce session hijacking vulnerabilities and improve session security.

Figure 3:
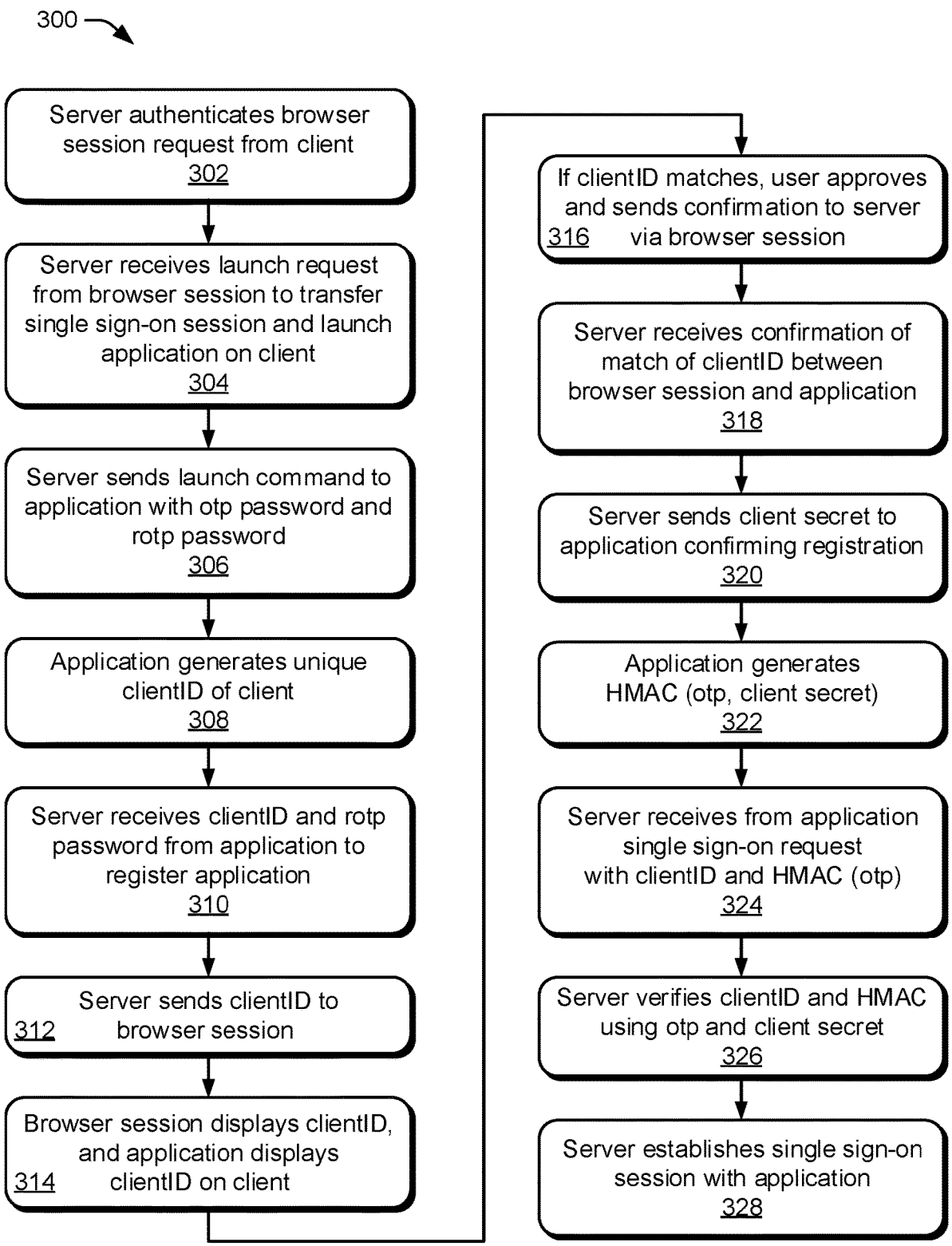
FIG. 3 is a flow chart illustrating an example method of transferring a single sign-on session between a browser and an application on a client in coordination with a server.

FIG. 3 is a flow chart illustrating an example method 300 of transferring a single sign-on session between a browser and an application on a client (e.g., thick or rich client device). At 302, a server authenticates a browser session request from a client as initiated by a user of the client. For example, a user of a browser-based console on a client may request a session connect with a management server. The browser-based console may be, for example, an endpoint management console for managing a network of devices, a web conferencing product, or other communication and collaboration product. The server may authenticate the browser session by comparing the credentials received with the request to the Lightweight Directory Access Protocol (LDAP) credentials stored on the server.

Once the browser session is authorized, at 304 the server receives a launch request from the browser session to transfer the single sign-on session (e.g., the browser session that was just authorized) to launch an application on the client, or to launch an application on another client device. This launch request may be initiated by a user of the browser session of the client that needs to accomplish functionality that is not provided with the browser session but that may be enabled through the application on the client. For example, if a user wants to remote control a managed device using Remote Desktop Protocol (RDP) or Virtual Network Computing (VNC), the browser-based experience limits the user in doing operations like File Transfer Protocol (FTP) or clipboard access from the browser session. Similarly, a user may need to bulk upload files to the management server from the client hosting the browser session. In this context, the user would like to single-sign-on-transfer the already authenticated browser session to the application, but needs to ensure the transfer is secure and not vulnerable to malicious hijacking.

At 306, responsive to the launch request, the server sends a launch command to the application on the client (e.g., via the browser session). The launch command includes first and second security credentials. In this example, the first security credential is a registration-related one-time password ("rotp"), and the second security credential is a separate one-time password ("otp"), although other security credentials may be used. At 308, the application generates a client identification ("clientID") representative of a unique identifier of the client. The client then sends to the server and, at 310, the server receives, the clientID and rotp from the application to register the application with the server. The clientID uniquely identifies the client in the request, and the rotp one-time password is an indicator that the application received the launch command from the server. However, to avoid potential hijacking by a malicious application that may have intercepted the rotp, the server now takes additional steps to increase security measures before completing registration of the application.

At 312, the server sends (e.g., passes) the clientID to the browser session. At 314, the browser session displays the clientID to the user and, generally simultaneously, the application displays the clientID to the user. This allows the user to view the clientID displayed by both the browser session and the application to compare them. At 316, if the clientID matches in both displays, the user approves and sends a confirmation message to the server, via the browser session, indicating that the clientID matches. As an example, for displaying the clientID, the browser session may display a message similar to the following:

"An application with clientID XXXX-XXXX is trying to register itself with this browser session. By registering itself, the application will be able to seamlessly continue your browser session to perform activities on your behalf. Make sure you can trust the application by validating the clientID. You can always revoke the permissions granted if needed."
"Allow the registration to continue?"

The user is then able to allow the registration to continue by entering an affirmative response at 316, thus sending a confirmation message back to the server approving that the clientID matches.

At 318, the server receives the confirmation of a match of the clientID as between the browser session and the application. At 320, responsive to receiving the confirmation, the server sends a third security credential, such as a client secret, to the application. This step generally confirms that the application is now registered with the server, but also indicates that the server will now wait to receive an authorized request from the application, referencing the security credentials, before the server establishes the single sign-on session with the application.

At 322, the application generates an encrypted security credential. In one example, this may be a keyed-hash message authentication code (HMAC), using the second security credential (e.g., otp) and the third security credential (e.g., client secret) as the secret key. For example: HMAC (otp, client secret). The application then passes to the server a request for a single sign-on session with the appropriate authorization information. This request may include the administrative user's identifier, the clientID, and the encrypted second security credential, HMAC (otp), that is recoverable using the third security credential (e.g., client secret) as the secret key.

At 324, the server receives from the application the request for a single sign-on session including the user's identifier, clientID, and HMAC (otp). At 326, the server verifies the user's identifier and the security credentials, including the clientID and HMAC (otp), by referencing the previously stored client secret as the secret key. If the user's identifier and all the security credentials match the server information, and particularly if the HMAC(otp) matches the "otp" already maintained by the server, by decrypting "otp" using the client secret, then at 328 the server establishes the single sign-on session with the application. This completes the secure authentication process for transferring the single sign-on browser session to the application.

Figure 4:
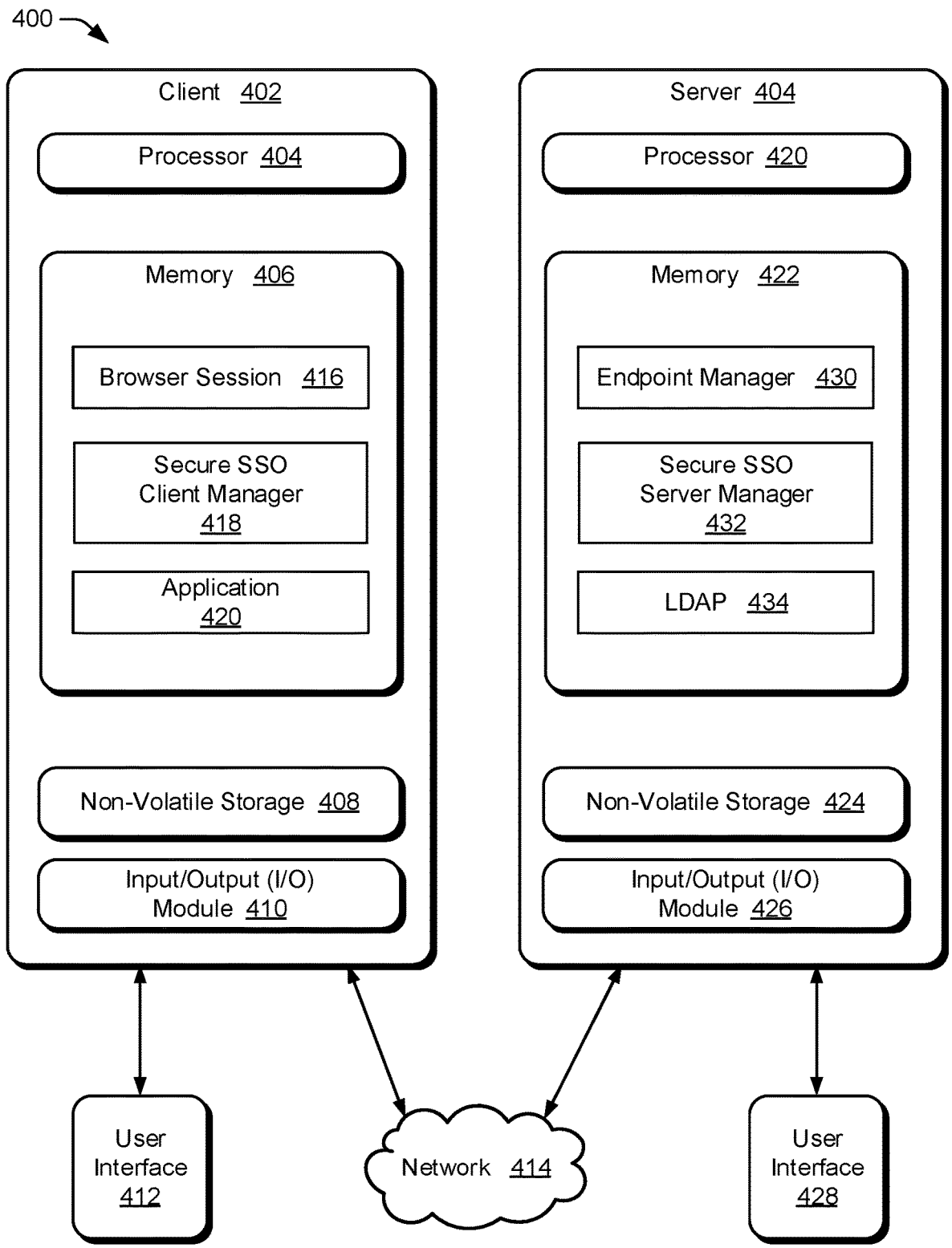
FIG. 4 is a block diagram illustrating an example server and client using a single sign-on manager for securely transferring a single sign-on session between a browser and an application on a client.

FIG. 4 is a block diagram 400 illustrating an example client 402 and server 404 configuration, with each deploying aspects of a single sign-on manager for securely transferring a single sign-on session between a browser and a client application according to methods and principles described in this disclosure. The client 402 may include a processor 404, a computer-readable media (memory) 406, a non-volatile storage 408, and an input/output (I/O) module 410. The client communicates with a user interface 412 and a network 414 by way of the I/O module 410. As some non-limiting examples, the client may be a server, desktop computer, notebook computer, mobile device, handheld device, mobile phone, or other computer device. The processor 404 may be any central processing unit (CPU) with one or more cores. The memory 406 may be any non-transitory, machine-readable (e.g., computer/processor-readable) medium, such as a RAM, ROM, flash memory, cache, SSD, or a combination thereof, for storing program files, data, an operating system, and other executable instructions. The non-volatile storage 408 may be any ROM, HDD, SSD, or similar storage device, for permanently storing program files, data, an operating system, and other executable instructions.

The user interface 412 may be a display, monitor, screen, touch screen, keyboard, mouse, other input or output device, or any combination configuration of these devices, to display or otherwise provide information from the client to a user, and to allow the user to input information to the client 402. The network 414 may be any local area network (LAN), wide area network (WAN), cloud, multi-cloud, hybrid cloud, or private on-premise cloud computing environment. The client 402 may also communicate, via the I/O module 410 and network 414, with the server 404 and other devices that may be on the network 414.

The client 402 includes instructions in the memory 406 for enabling a browser session 416 when executed by the processor 404. The memory 406 also includes a secure SSO client manager (single sign-on client manager) 418 that functions according to principles described in this disclosure when executed by the processor 404. The memory 406 also includes an application 420 that provides functionality to augment the browser session, when executed by the processor 404, and to which the browser session transfers single sign-on authorization for functional execution.

Similar to the client, the server 402 may include a processor 420, a memory 422, a non-volatile storage 424, an input/output module 426, and a user interface 428. The server communicates with the client 402, and other devices that may be on the network 414, via the intput/output module 426 and the network 414. The memory 422 includes an endpoint manager 430 and a secure SSO server manager 432 (single sign-on server manager) that, when executed by the processor 420, provides functionality for coordinating with the secure SSO client manager 418 of the client 402 for transferring a single sign-on session of the browser session 416 to the application 420 of the client. The server 404 may also include a Lightweight Directory Access Protocol (LDAP) database 434 in the memory 422, for authenticating a connection with a user of the browser session 416.

Although an endpoint manager 430 is discussed in this example, it is understood that it is referenced merely as an example product with functionality that may be useful for providing a single sign-on transfer between a browser session 416 and an application 420 on the client. As previously described, products such as video or web conferencing, or other communication and collaboration, may similarly be referenced for which providing a single sign-on transfer between a browser session 416 and an application 420 is beneficial. Note, also, that the executable modules within the memory 406 of the client and the memory 422 of the server are shown separately for visual reference and discussion purposes. However, these may be combined, or further separated into additional modules, according to design and functional preference, for implementing functionality according to principles of this disclosure. For example, the endpoint manager 430 on the server 404 may include all or portions of the functionality of the secure SSO manager 432. Similarly, the browser session 416 and the application 420 on the client 402 may include all or portions of the secure SSO client manager 418.

This functional configuration of the client 402 and the server 404, including functionality of the secure SSO client manager 418 and the secure SSO server manager 432, increases security and reduces malicious session hijacking when transferring a single sign-on session between the browser session 416 and the application 420. For example, as previously described, the browser session 416 on the client 402 may initially connect and authenticate with the endpoint manager 430 of the server 404, to enable a client console for a user with respect to the endpoint manager. The user of the browser session then sends a request to the endpoint manager 430, via the secure SSO client manager 418, to launch the application 420 on the client in order to enable functionality not supported by the browser session alone. In response, the endpoint manager 430 then sends a launch command, via the secure SSO server manager 432, to the browser session 416 of the client 402 to launch the application 420. The launch command includes first and second security credentials, such as a registration-related one-time password (rotp) and a simple one-time password (otp).

In further discussion of block diagram 400, all the following described communications between the browser session 416, application 420, and endpoint manager 430, are accomplished by way of coordinating with the secure SSO client manager 418 and the secure SSO server manager 432. However, for simplicity of discussion, only the browser session, application, or endpoint manager will be mentioned, respectively, in executing the communication for effectuating the transfer of the single sign-on session. In this context, the application 420 now requests to register itself with the endpoint manager 430 (e.g., by way of using the secure SSO client manager 418 functionality and the secure SSO server manager 432 functionality). This request for registration includes the rotp and a clientID (e.g., random string or other unique identifier) generated by the application with respect to the client.

Upon receiving the rotp, the endpoint manager 430 passes to the browser session 416 a consent screen with the clientID for display on the client 402 that prompts the user to approve the attempted registration by the application 420. The application separately, and simultaneously, displays the clientID so the user can validate and confirm the clientID being displayed on the browser and by the application, and send the confirmation to the endpoint manager 430. The endpoint manager then sends a third security credential, such as a unique client secret, to the application 420. The application then encrypts the otp previously received. It may do this, for example, by generating a keyed-hash message authentication code (HMAC) using the otp, and by using the client secret as the secret key. The application 420 then sends a request for single sign-on authorization to the endpoint manager 430 using the clientID and the HMAC of the otp.

The endpoint manager 430 can then validate the single sign-on session because it is already aware of the client secret, and can decrypt the otp using the client secret. This completes the transfer of the single sign-on session from the browser session 416 to the application 420 with increased security and reduced vulnerability to session hijacking by a malicious entity.

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of transferring a single sign-on session between a browser session and an application, the method comprising:
   sending, by a server, a launch command to launch the application on a client, the launch command responsive to a launch request received by the server from the browser session and indicative of a request to transfer the single sign-on session between the browser session and the application, the launch command comprising a first security credential and a second security credential;
   registering, by the server, the application, the registering comprising: receiving from the application the first security credential and a client identification unique to the client; receiving from the browser session a client identification confirmation indicating that the client identification received by the server matches the client identification unique to the client; and sending the application a third security credential responsive to the client identification confirmation; and
   establishing, by the server, the single sign-on session with the application, the establishing responsive to the server receiving from the application the client identification and an encrypted version of the second security credential relative to the third security credential.

2. The method of claim 1 further comprising the server authenticating the browser session prior to receiving the launch request from the browser session.

3. The method of claim 1 wherein the client comprises a thick client.

4. The method of claim 1 wherein the launch request received by the server from the browser session comprises a launch request received by the server from the browser session executing on the client.

5. The method of claim 1 wherein at least one of the first security credential or the second security credential comprises a one-time password.

6. The method of claim 1 wherein the third security credential comprises a client secret.

7. The method of claim 1 wherein the client identification comprises at least one of a string or a numerical value generated with respect to uniquely identifying the client.

8. The method of claim 1 wherein registering the application further comprises:
   sending to the browser session, by the server, the client identification;
   waiting, by the server, for the browser session to display the client identification, and for the application to display the client identification on the client, and for a comparison to occur relative to the browser session displaying the client identification and the application displaying the client identification; and
   receiving, by the server, from the browser session, the client identification confirmation indicative of a match of the client identification displayed by the browser session and the client identification displayed by the application.

9. The method of claim 8 wherein the client identification confirmation is indicative of a completed visual comparison, by a user of the browser session, confirming the match of the client identification displayed by the browser session and the client identification displayed by the application.

10. The method of claim 1 wherein the encrypted version of the second security credential comprises a cryptographic message authentication comprising the second security credential relative to the third security credential.

11. The method of claim 10 wherein the cryptographic message authentication comprises a keyed-hash message authentication code using the second security credential with respect to the third security credential as a secret key.

12. The method of claim 1 wherein establishing the single sign-on session with the application further comprises: verifying, by the server, the client identification, and the second security credential relative to the third security credential, and responsive to the verifying, sending to the application a session authorization confirmation.

13. The method of claim 1 further comprising revoking, by the browser session, the establishing of the single sign-on session with the application.

14. The method of claim 13 further comprising establishing the single sign-on session with the application contingent on the browser session not previously revoking the single sign-on session with the application, and the browser session not previously indicating to disallow establishing the single sign-on session.

15. A single sign-on management system comprising a first computing device and instructions that, when executed by the first computing device, cause the first computing device to:
   send a launch command to launch an application on a second computing device, the launch command responsive to a launch request received by the first computing device from a browser session of the second computing device, the launch command indicative of a request to transfer a single sign-on session between the browser session and the application, the launch command comprising a first security credential and a second security credential;
   receive, from the application, the first security credential and an identification indicative of an identification unique to the second computing device;
   receive, from the browser session, an identification confirmation indicating that the identification received by the first computing device matches the identification unique to the second computing device;
   send, to the application, a third security credential responsive to the identification confirmation; and
   establish the single sign-on session with the application, the establishing responsive to the first computing device receiving, from the application, the identification and an encrypted version of the second security credential relative to the third security credential.

16. The single sign-on management system of claim 15 wherein at least one of the first security credential or the second security credential comprises a one-time password.

17. The single sign-on management system of claim 15 further comprising instructions that when executed by the first computing device cause the first computing device to:
send to the browser session the client identification;
wait for the browser session to display the identification, and for the application to display the identification on the second computing device, and for a comparison to occur relative to the browser session displaying the identification and the application displaying the identification; and
receive, from the browser session, the identification confirmation indicative of a match of the client identification displayed by the browser session and the client identification displayed by the application.

18. The single sign-on management system of claim 15 wherein the encrypted version of the second security credential comprises a cryptographic message authentication comprising the second security credential relative to the third security credential.

19. The single sign-on management system of claim 15 further comprising instructions that when executed by the first computing device cause the first computing device to: verify the client identification, and the second security credential relative to the third security credential, and responsive to the verifying, send to the application a session authorization confirmation indicative to establish the single sign-on session.

20. A non-transitory machine-readable storage medium storing instructions that when executed by at least one computing device cause the at least one computing device to:
send a launch command to launch an application on a second computing device, the launch command responsive to a launch request received by the first computing device from a browser session of the second computing device, the launch command indicative of a request to transfer a single sign-on session between the browser session and the application, the launch command comprising a first security credential and a second security credential;
receive, from the application, the first security credential and an identification indicative of an identification unique to the second computing device;
receive, from the browser session, an identification confirmation indicating that the identification received by the first computing device matches the identification unique to the second computing device;
send, to the application, a third security credential responsive to the identification confirmation; and
establish the single sign-on session with the application, the establishing responsive to the first computing device receiving from the application the identification and an encrypted version of the second security credential relative to the third security credential.

\* \* \* \* \*